United States Patent [19]
Madson

[11] 4,310,853
[45] Jan. 12, 1982

[54] DATA SIMULATION IN SECTOR SCAN IMAGING SYSTEMS

[75] Inventor: Lawrence P. Madson, Littleton, Colo.

[73] Assignee: Technicare Corporation, Solon, Ohio

[21] Appl. No.: 173,800

[22] Filed: Jul. 30, 1980

[51] Int. Cl.³ .............................................. H04N 7/18
[52] U.S. Cl. ...................................... 358/140; 73/618; 358/112; 358/138; 364/515
[58] Field of Search ................. 358/140, 138, 93, 112; 364/515; 73/618, 620

[56] References Cited

U.S. PATENT DOCUMENTS

| | | | |
|---|---|---|---|
| 3,792,423 | 1/1974 | Becker | 367/11 |
| 3,815,049 | 6/1974 | Macovski | 331/107 R |
| 3,918,025 | 11/1975 | Koshikawa | 367/110 |
| 4,016,750 | 4/1977 | Green | 73/629 |
| 4,028,934 | 6/1977 | Sollish | 73/620 |
| 4,030,342 | 6/1977 | Bond | 73/627 |
| 4,033,177 | 7/1977 | Case | 73/611 |
| 4,034,744 | 7/1977 | Goldberg | 128/660 |
| 4,064,741 | 12/1977 | Reynolds | 73/620 |
| 4,078,435 | 3/1978 | Kossoff | 73/621 |
| 4,111,055 | 9/1978 | Skidmore | 73/620 |
| 4,135,406 | 1/1979 | Kretz | 73/620 |
| 4,145,680 | 3/1979 | Smith | 367/7 |
| 4,149,420 | 4/1979 | Hutchison | 73/626 |
| 4,154,113 | 5/1979 | Engeler | 73/626 |
| 4,155,258 | 5/1979 | Engeler | 73/626 |
| 4,155,260 | 5/1979 | Engeler | 73/626 |
| 4,159,462 | 6/1979 | Rocha | 367/97 |

*Primary Examiner*—Howard Britton
*Attorney, Agent, or Firm*—Audley A. Ciamporcero, Jr.

[57] ABSTRACT

Encoded data is sequentially read into a shift register having a number of stages larger than the largest inter-scan "void" or "hole" to be filled. A priority encoder determines the length of the void to be filled, and the amplitude difference of successive scan data samples is evaluated. For each display picture element in the void, a weighting select PROM determines an appropriate weighting factor, based on the size of the void to be filled. Separate positive differential and negative differential memories are thereby energized to produce, for each display picture element in the hole, a simulated display picture data element.

10 Claims, 2 Drawing Figures

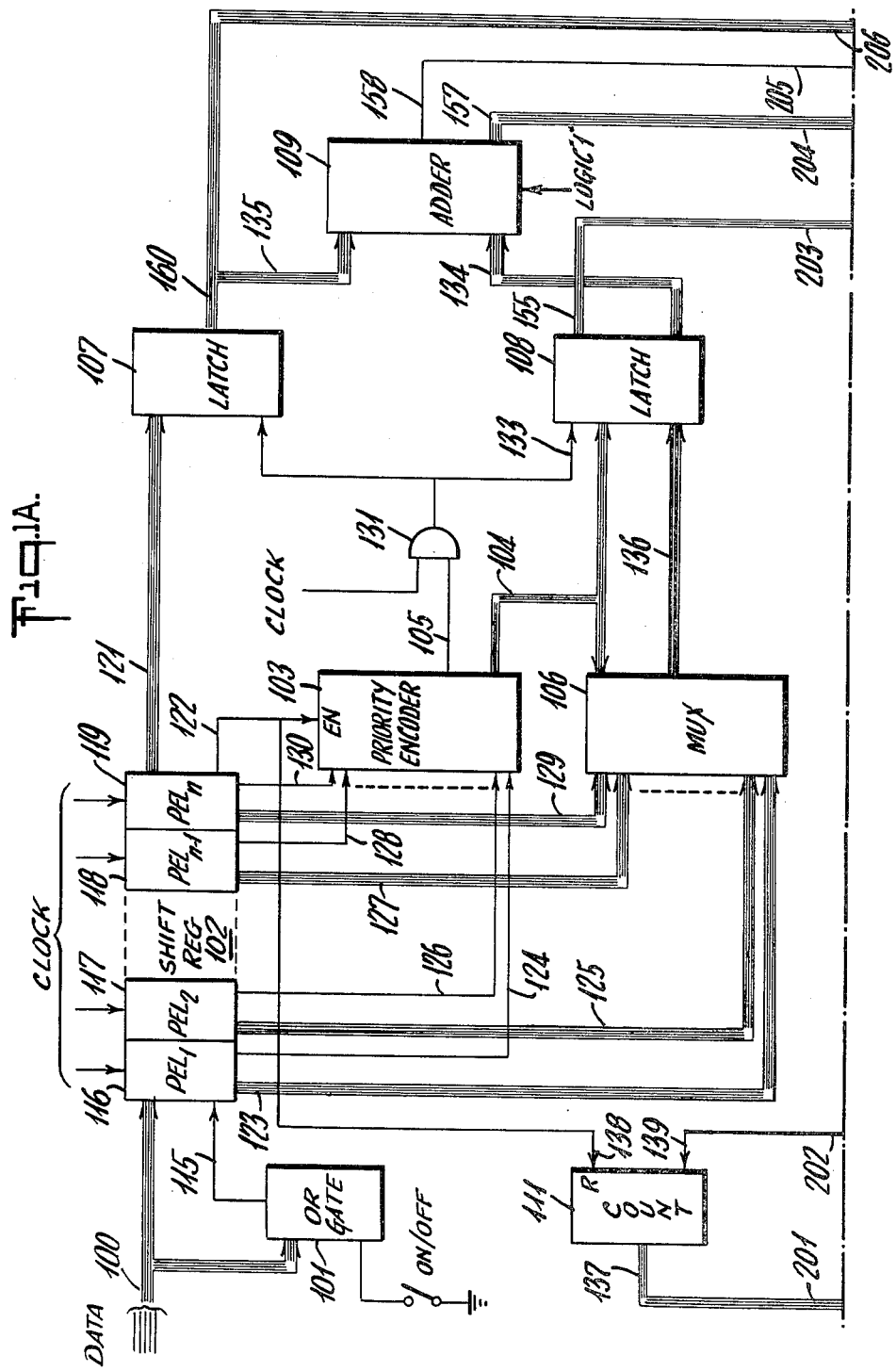

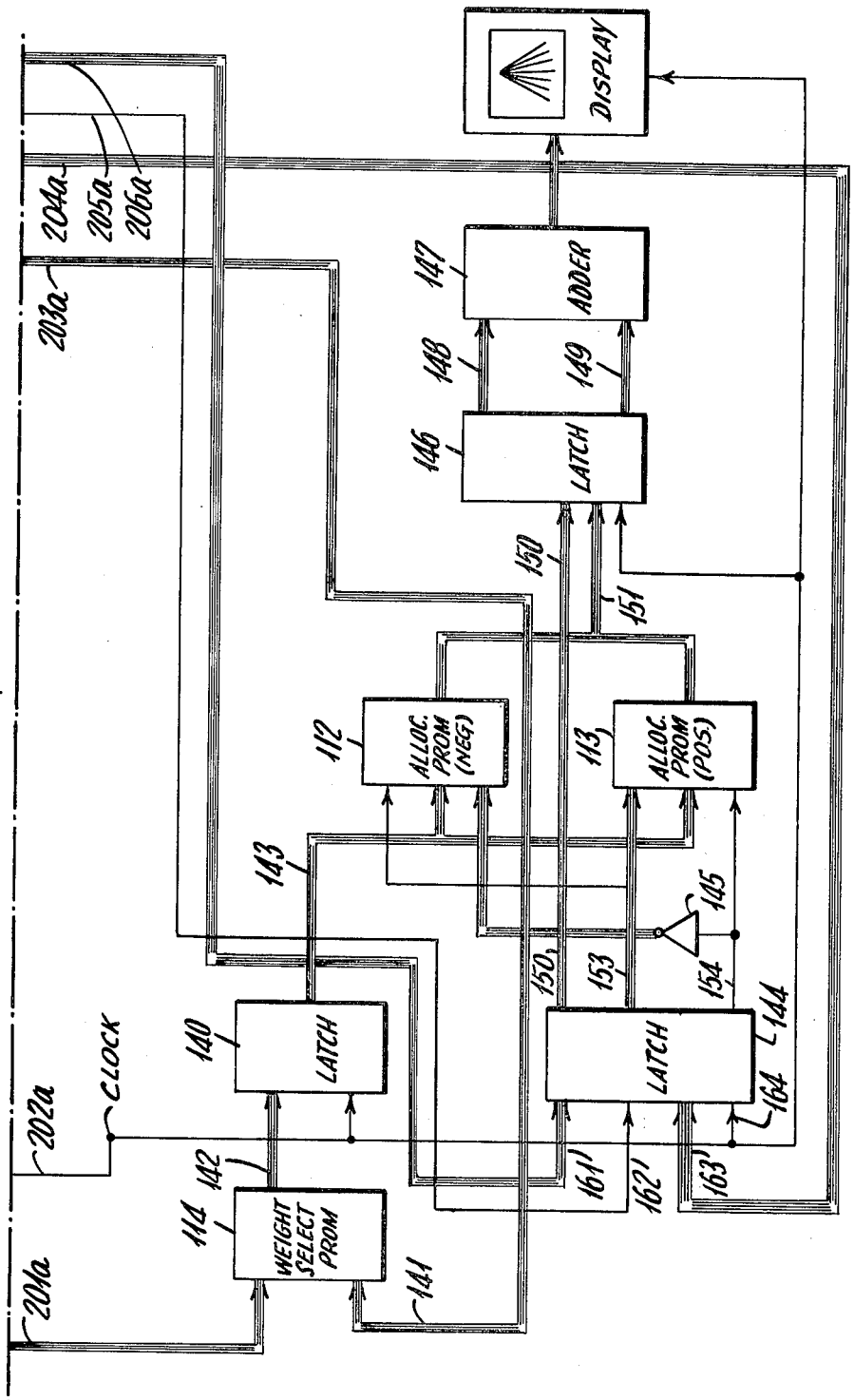

DATA SIMULATION IN SECTOR SCAN IMAGING SYSTEMS

FIELD OF THE INVENTION

This invention relates to imaging systems employing radially extending discrete scans to form a composite sector image, and more particularly to simulation of data for display in the "holes" or "blanks" in the image display between actual data from the discrete scans.

BACKGROUND OF THE INVENTION

An increasingly popular type of ultrasound imaging system is the sector scan imaging system. These systems typically employ a source of focused sonic energy, such as various combinations of transducers and/or mirrors and/or lenses, which are electronically or mechanically caused to move the sonic energy penetration back and forth such that discrete pulse-echo scans all pass into and out of the body of the subject from a relatively small area, which often is just at the contact point with the patient, or slightly thereabove or therebelow. Hence, the composite image which is developed from a large number of these radially extending discrete pulse-echo scans is in the form of a sector of a circle, which broadens as a function of depth of the pulse-echo scan into the patient. Such systems have been found clearly advantageous for applications such as cardiac imaging, wherein high sonic impedance elements, such as the rib cage, severely restrict the space through which the imaging system may have access to irradiate the relevant portion of the patient's body. Utilization of the sector scan approach allows for application and withdrawal of the ultrasound pulse-echo signals from a narrow point, with the sector or fan shaped imaging field suitably enclosing the image field.

One difficulty which is inherent to displaying the sector scan image relates to the voids (also referred to herein as "holes" or "blanks") between the discrete radial scans, for which no actual pulse-echo imaging data has been developed. These voids are themselves sector shaped, narrow near the top, or narrowest portion of the sector image, and becoming progressively wider near the bottom portion of the image field. For example, it is possible that, in the lower extremities of a sector scan image, upwards of ten to twelve out of every fourteen horizontal picture elements may constitute voids, about which no actual pulse-echo scan data is available. Obviously, production and display of a useful and subjective pleasing image is impossible unless some data actually is displayed for each picture element, in the viewing field, including these voids or blanks.

It is an object of the present invention to provide methods and apparatus for generating simulated data to fill the voids or holes between radially extending discrete pulse-echo scans in a sector scan system.

Typical approaches to such data simulation involve replication of actual data from the previous scan. Replication is quite impractical as the number of holes gets larger, perhaps approaching nine to twelve picture elements.

It is accordingly an important object of the present invention to provide a void filling scheme wherein the simulated data is appropriately produced based not only on the actual data developed at either side of the void, but also based upon the portion of the sector in which the display picture element is located.

It is no less important object that the generation and provision of such simulated data occur at a rate which is not detrimental to the critically important real time character of sector scan systems.

It is a still further object to provide an approach which allows adequate flexibility for operation in various types of scanning systems, such that changes in the weighting allocations may be simply wrought to adapt a given system to function in accordance with various system and imaging constraints.

SUMMARY OF THE INVENTION

In accordance with the principles of the present invention, there is provided a mechanism for evaluating uniquely, at each horizontal scan line of the sector scan video display, the size (in numbers of display picture elements), of the void to be filled, and the respective amplitudes of, and amplitude differential between the actual pulse-echo scan picture element data (i.e., "true data") on either side of the void. At all times, there is maintained in storage a collection of weighting factors having respective correspondence to a variety of void sizes and location of the given picture element within the void. In separate memory means, the available display picture element codes are stored, and are allocated to each display picture element in the void on a real time basis.

In a preferred embodiment of the present invention, a multiple element shift register stores, on a real time basis, a number of data words which in the aggregate correspond to two more than the number of picture elements in the widest void which may occur. Thus, the shift register always includes, at the least, the picture elements defining the void itself, and on either side thereof, data representing the actual scan information on either side of the void. A priority encoder determines the length of the void, and such determination, inasmuch as it also identifies the true data on either side thereof, also allows for the evaluation of the amplitude differential between the associated true data samples on either side of the void. Thereupon, on a real time basis at the display scanning rate, a counter enables the production, for each separate display picture element within the void, of a weighting selection factor, by appropriately accessing a weighting selection memory. In the composite, the weighting selection memory embodies a suitable weighting characteristic (e.g., linear or Gaussian), and based on that composite characteristic, allocates a given weighting to be allocated to each picture element in the void, based on the total length of the void. Once the weighting selection is made for a given picture element, separate storage PROMs allocate a given coded amplitude to that weight, based upon the actual data elements on either side of the void. In the aggregate, a synchronous real time readout and display properly incorporates the true scan data elements and the simulated data filling the voids therebetween.

DESCRIPTION OF THE DRAWINGS

FIGS. 1A and 1B show respective portions of a schematic diagram of a system embodying the principles of the present invention in preferred form.

DETAILED DESCRIPTION AND BEST MODE

FIGS. 1A and 1B, when laid adjacent one another to complete connections 201-201A, 202-202A, 203-203A, 204-204A, 205-205A, and 206-206A, form a preferred embodiment of the principles of the present invention.

The embodiment of FIGS. 1A and 1b is configured on a level of detail whereby it may be readily fabricated by those of ordinary skill in the art utilizing off the shelf integrated circuit elements, as particularly identified throughout the following description.

Although data capability and characteristics generally will vary from system to system, the present discussion assumes utilization of a five bit binary code for each picture element (i.e., 32 gray levels), and that a standard horizontal scan CRT will be utilized to display a real time sector scan image which may have as few as 90 "true data" radially extending pulse-echo lines. It is to be understood, of course, that the CRT being utilized, the number of radial lines comprising the sector scan, and the actual sector size will vary in accordance with the nature of the sector scan system, and the needs and desires of designers of ordinary skill in the art. It is likewise anticipated, however, that the principles of the present invention may be freely adapted to function in accordance with any such systems, without departure from the spirit or the scope of the present invention. For illustrative purposes, the embodiment of FIGS. 1A and 1B shall be assumed to deal with a system which is, currently, one of the severest from the standpoint of void size and variation, i.e., a sector defined by 90 radial pulse-echo lines dispersed through a 90° arc, wherein the horizontal void between true data may be up to 10 or 12 display picture elements wide.

Various apparatus in the embodiment of FIGS. 1A and 1B is shown being pulsed by an unspecified "clock", which, it is to be understood, is operating at a rate which is compatible with (and hence at least as fast as) the real time generation of data and display thereof on a raster scanned CRT type display. For purposes of the present invention, the clock rate is the rate at which true data and "no data" picture elements in the void are pulsed into the apparatus of FIG. 1A, and correspondingly are likewise pulsed out, on a picture element by picture element basis, for incorporation into the CRT display. Although FIGS. 1A and 1B show the clock being coupled to the display, it is equally likely that the clock signals would be generated by the display apparatus and delivered to the FIG. 1A–1B apparatus.

Referring to the drawings, data, appropriately digitally coded and preferably furnished in five bit parallel form, is coupled via an input bus 100 to the first stage 116 of a shift register 102. For a system which is designed to fill interscan voids up to 10 picture elemente elements long, the shift register 102 will be 12 stages long, and so on. Each stage of the shift register 102 is pulsed by the system clock, such that at any given time, the shift register represents picture element data along a portion of a horizontal video line, and each stage 116–119 of shift register 102 either includes the five bit encoded data from a radial scan line (i.e. "true data"), or the coded designation that no true data exists for the associated picture element (e.g. "00000"). With each clock pulse, in conventional shift register fashion, a new five bit word is written into the first stage 116 of shift register 102, each word of data in the register is advanced from one stage to the next, and a five bit word is shifted out of the final stage 119 of shift register 102 via bus 121 to a latch 107.

The input data words are also furnished to an OR-gate 101, the other input of which is connected to an on/off switch. The output of OR-gate 101 is also furnished to the shift register 102 via line 115, and hence each stage of the shift register carries not only a five bit word representing data, but also a bit from gate 101 indicating whether the associated data word is true data. Preferably, a logical "1" from OR-gate 101 represents true data, and a logical "0" from OR-gate 101 indicates a picture element of void or hole. Additionally, the output bit from the OR-gate may be controlled by operation of the on/off switch. For purposes of the present discussion, the bit generated by OR-gate 101 and stored with its associated data word in the register 102, shall herein be designated the "gate bit".

Each stage 116 through 119 of the shift register 102 has its gate bit connected via lines 124, 126, 128, 130, and so on, to the inputs of a priority encoder 103. Additionally, the gate bit from the final stage 119 of the shift register 102 is coupled to the enable input of the encoder 103.

It is the function of the priority encoder 103 to determine the existence and the width of a data void. Accordingly, the priority encoder 103 is enabled by the presence of a logical 1 gate bit in the final stage 119 of the shift register 102. When that bit is a logical 0, indicating a display picture element in a "hole", the priority encoder is not enabled; the presence of a logical 1 gate bit in the final stage 119 of shift register 102 indicates a "true data" picture element, corresponding to one of the radial pulse-echo lines of the sector. The priority encoder has inputs 124, 126, 128, and 130, and so on each presenting the gate bit from a different stage of the shift register 102. When enabled at line 122, the priority encoder 103 determines which stage in the shift register 102 has the next logical one as a gate bit, working from picture element n ("PEL$_n$") backwardly through the shift register 102. The number of logical zeroes between the logical 1 gate bit in the last stage 119 of shift register 102, and the next adjacent "true data" sample in register 102, will be recognized as the width of the void, or hole. This width is encoded and presented at output line 104 of the encoder 103. For a twelve stage shift register 102, a four bit binary code is sufficient to account for all possibilities, and accordingly, it is understood that output 104 of priority encoder 103 presents a four bit parallel encoded version of the next void for which picture element data is to be generated. In a preferred embodiment, the priority encoder 103 is embodied as a pair of interconnected commercially available 74148 priority encoder chips, each of which has seven prioritized input terminals, and the capability of producing the requisite encoded output.

The priority encoder 103 also provides a one bit output at line 105 whenever it receives an enabling pulse at input 122. This digit from the encoder 103 is coupled to an And-gate 131, which is also pulsed from the system clock, and which, when energized, enables a pair of latches 107 and 108. Latch 107 receives the "true data" word via line 121 from the last stage 119 of the shift register 102. Hence, as the priority encoder identifies the "true data" sample adjacent the void to be filled with simulated data, that "true data" sample is passed into latch 107 as the encoded void width, on line 104, is coupled to the latch 108 and to a multiplexer 106.

The multiplexer 106 receives, at its inputs, the encoded data information from each element 116 through 119, etc., of shift register 102. When the multiplexer receives an indication, via line 104, of the length of the void to be filled, the multiplexer thereby is enabled to select the next "true data" sample, and transmits its complement, via line 136, to the latch 108. Preferably, the multiplexer is comprised of commercially available 74S251 chips, suitably cascaded to meet the data capacity requirements set by the stages of shift register 102, and the coding used for the data itself.

Latches 107 and 108, and in fact the other latches 140, 144, and 146 in the figures, are utilized as is known in the art, for uniformity and coordination of timing throughout the system. In a preferred embodiment, and depending upon the data capacities required, the latches are variously embodied as commercially available 74S174 six bit latches and 74S374 eight bit latches.

The "true data" sample from the last stage 119 of shift register 102 is coupled to one input of an adder 109, as well as to an input 161 of latch 144. In a preferred embodiment, the adder 109 is embodied as a commercially available 74LS283 integrated circuit chip. The carry input of adder 109 is maintained at a logical "1" state. Such connection causes the 74LS283 circuit to perform a "two's complement" subtraction of the data on line 134 from that on line 135. It will be appreciated that utilization of different logical operations to perform the requisite subtraction. Coupled to the other input 134 of adder 109 is the "true data" sample from the other side of the void for which data is to be simulated, as detected by multiplexer 106 and advanced to latch 108 via line 136. The adder 109 determines the amplitude difference between the two "true data" samples at either extremity of the void, presenting this amplitude differential at output bus 157, while presenting the sense or sign of that differential as a logical 1 or 0 on output line 158. Both the amplitude differential from output 157 and the sign bit from output 158 are coupled to the latch 144, at respective inputs 163 and 162 thereof.

In partial summary, the operation of the apparatus hereinbefore described functions to identify "true data" samples at each extremity of the void to be filled with simulated data, the difference and sense of the difference between them, and the number of picture elements in the void.

The gate bit from the last stage 119 of shift register 102 (which enabled the priority encoder 103 also) is coupled to reset a counter 111. The counter 111 continously is incremented by the system clock via input 139, thus producing at output 137 a four bit binary encoded representation of the number of clock pulses counted at 139 since the most recent resetting of counter 111 via input 138 (i.e., by a logical 1 gate bit in stage 119 of shift register 102). This four bit encoded ongoing count is coupled to one input of a weighting selection PROM 114 (i.e., a programmable read only memory), the other input of which receives the four bit encoded void length from latch 108 via output 155 thereof.

The weighting selection memory 1114 is charged with the decision of allocating, given the length of the void to be filled, a weighting code to each picture element in that void. These weighting codes correspond to actual coded, stored amplitude differentials in amplitude allocation PROMs 112 and 113. Thus, the codes essentially embody a mapping algorithm assigning the actual weights to the individual picture element, which assignments are executed at PROMs 112 and 113.

For may applications a linear weighting scheme is suitable, whereas for others a Gaussian distribution is preferable. In any event, it may reasonably be assumed that the proliferation of applications will engender a similar proliferation of weighting schemes which might be appropriate to such applications, perhaps involving parabolic, exponential, or a similar variety of nonlinear weighting schemes.

In the preferred embodiment of FIGS. 1A and 1B, the weighting selection memory 114 is a commercially available 256×4 programmable read only memory having the commercial designation MMI6301-1. A such, in a preferred embodiment the weighting selection PROM is provided with unique weighting codes (each in four bit binary form) for each picture element of a void for each possibility of void picture element length. As noted in the drawing, the weighting selection PROM 114 receives, via input line 141, the actual length of the void to be filled, thereby permitting the weighting selection PROM to designate the set of weighting codes to be allocated to the respective picture elements therein. The four bit binary count received via line 137 from counter 111 provides, in sequential fashion, the opportunity for the weighting selection PROM 114 sequentially to allocate these codes in the form of four bit words at output line 142. This four bit weight selection code is coupled to a latch 140, and thence, by means of line 143 to a pair of amplitude allocation PROMs 112 and 113.

As previously noted, at any given time (i.e., clock period), the latch 144 is furnished with the "true data" encoded picture element which was first detected in the last stage 119 of the shift register 102, the differential amplitude between that true data picture element and the next true data element on the other side of the void to be filled, and the sign bit indicating the sense of that amplitude differential. Likewise the latch 140 presents, on an iterative basis, the weighting selection code for associated picture elements in the void.

The sign bit, indicating the sense of the differential, is coupled directly to the "enable" input of a positive amplitude allocation PROM 113, and through an inverter 145 to the "enable" input of a similar, negative amplitude allocation PROM 112. Thus, during any given clock period, one or the other, but not both of the PROMs 112 and 113 is enabled. At each such time, the PROMs 112 and 113 receive the true data to true data amplitude difference from bus 157 of adder 109, via latch 144 and bus 153. Hence, each clock period enables a different weighting selection code to be received via bus 143, and the consequent generation of an amplitude differential. Accordingly, during the data simulation or "hole filling" process, each clock period causes either PROM 112 or PROM 113 to couple to latch 146 a five bit encoded amplitude differential.

Both the "true data" picture element (PEL$_n$ from register 102) data and the allocated differential from PROM 112 or PROM 113, are coupled from latch 146 via respective buses 148 and 149 to an adder 147, which combines them on a clock period by clock period basis, and couples the data so generated to the display unit, for production of the full CRT picture.

It will be appreciated that utilization of the PROMs 112, 113, and 114 allows for tremendous flexibility to adapt the system of FIG. 1A and 1B to different requirements. That is, simple recoding of the weighting selection algorithm by reprogramming PROM 114, and/or alteration of the allocation differentials at PROMs 112 and 113, facilitates complete reconfiguration of the simulation methodology practiced by the system of FIGS. 1A and 1B.

It will therefore be likewise appreciated that numerous alternative approaches will occur to those of ordinary skill in the art without departure from the spirit or scope of the present invention. For example, different weighting approaches may be utilized for different portions of the video display, such as replicating at the top and interpolating and/or utilizing Gaussian weighting approaches at the bottom.

I claim:

1. In an imaging system employing sequential radially extending discrete scans to form a composite sector image for display on a horizontally scanned video display, apparatus for simulating data for display at picture elements intermediate actual data along said radial scans comprising:
   (a) a source of timing signals;
   (b) means for identifying
      (i) successive radial scan data picture elements in a horizontal display line, and
      (ii) the void length therebetween, defined by the number of display picture elements horizontally between said radial scan data picture elements;
   (c) means for evaluating the amplitude difference between said successive radial scan data picture elements; and
   (d) memory means, responsive to said means for identifying, to said means for evaluating and to said timing signal, for storing and producing, in accordance with a predetermined weighting scheme, a simulated picture element value for each said display picture element along said horizontal void, said simulated elements being arrayed in amplitude, in accordance with said predetermined weighting scheme, between the respective amplitudes of said successive radial scan data picture elements.

2. Apparatus as described in claim 1 wherein said memory means comprises first memory means for storing and producing, at a rate of said timing signals, distinct weighting selection codes for each picture element within the void based upon the total number of picture elements in said void.

3. Apparatus as described in claim 2 wherein said memory means further includes amplitude allocation means, responsive to said first memory means and to said means for evaluating, for allocating a simulated amplitude to each picture element in said void, based upon the associated weighting code produced by said first memory means.

4. Apparatus as described in claim 2 wherein said weighting selection codes define a Gaussian amplitude mapping algorithm for each picture element of a void as a function of the length of the void in picture elements.

5. Apparatus as described in claim 2 wherein said weighting selection codes define a linier amplitude mapping algorithm for each picture element of a void as a function of the length of the void in picture elements.

6. Apparatus as described in claim 2 wherein said weighting selection codes define a Gaussian amplitude mapping algorithm for each picture element of a void as a predetermined mathematical function of the length of the void in picture elements.

7. Apparatus as described in claim 2 wherein said means for identifying includes:
   (a) a shift register of n stages, wherein said apparatus is adapted to accommodate void lengths of at most n+2 display picture elements;
   (b) priority encoder means for identifying respective data picture elements next adjacent a void; and
   (c) means for evaluating the number of void picture elements between said respective data picture elements.

8. Apparatus as described in claim 7 and further including means, responsive to said shift register means, and said encoder means, for determining the amplitude differential, and the sense of said amplitude differential between said respective data picture elements.

9. Apparatus as described in claim 8 and further including counter means, incremented by said timing signals, and reset by each occurrence of a different void in said shift register means, for designating, in real time correspondence, each disply picture element in said different void.

10. Apparatus as described in claim 9 wherein said first memory means operates in response to said counter means, allocating a weighting selection code for each picture element in a void once for each said increment.

* * * * *